United States Patent Office 3,205,171
Patented Sept. 7, 1965

3,205,171
THICKENING OF HIGH TEMPERATURE
GREASES
John C. Goossens, Harvey, Ill., assignor to Standard Oil
Company, Chicago, Ill., a corporation of Indiana
No Drawing. Original application Mar. 4, 1959, Ser. No.
797,050. Divided and this application Oct. 14, 1963,
Ser. No. 331,332
7 Claims. (Cl. 252—47.5)

This application is a division of my copending application Serial No. 797,050, filed March 4, 1959, and entitled "Thickening of High Temperature Greases."

This invention relates to new additive agents for high temperature lubricants and grease compositions containing the same. More particularly this invention pertains to compositions suitable for use as gelation or thickening agents in thermally stable grease for use under high temperature conditions and greases thickened with the same.

As lubricants are required to perform at higher and higher temperatures because of increased speeds of engines and machines, the advent of jet propulsion, atomic energy as a source of power, etc., it has become increasingly difficult to prepare greases fullfilling the requirements of such lubricants. In attempting to provide such greases, the art has progressed from the use of petroluem lubricant vehicles thickened with metal soaps of long chain fatty acids, e.g. sodium and calcium soaps, to more thermally stable synthetic lubricating oils such as the aliphatic diesters of dicarboxylic acids, silicone polymers, etc., thickened with such soaps as lithium hydroxystearate or inorganic materials usch as silica gels. The progress of thickener research has not in general, however, kept pace with the development of lubricant vehicles. And at temperatures as high as 400° to 450° F. or higher, there are few greases available which will retain their consistency and lubricity for any substantial period of time.

In recent years various synthetic lubricant vehicles, e.g. the silicones, fluorocarbons, etc., have been found to be potentially valuable for use in greases employed at very high temperatures because of their thermal stability. Unless, however, a thickener having substantially the same degree of thermal stability is available to produce a grease from such an oil, they are of little use in the preparation of greases.

I have found that a lubricant grease, which is stable and gives excellent lubrication at elevated temperatures as high as about 450° F. for substantial periods of time, may be prepared using a novel thickening agent as is hereinbelow more particularly set out. Accordingly, the present grease thickening agent is a reaction product of unknown structure prepared by the reaction of melamine with dimethyl sulfoxide. The preparation of the thickening agent is carried out by reacting melamine with dimethylsulfoxide in the presence of a trace of acid catalyst and removing unreacted occluded dimethyl sulfoxide from the resulting product. The thickening agents have excellent thickening power in lower thickener concentrations than normally used in extreme high temperature greases. The thickeners may be used in amounts of from about 5 to about 30 weight percent and more advantageously from about 8 to about 20 weight percent in an oleaginous lubricant vehicle to form a grease composition which is stable under conditions of high temperature use.

More particularly, the above reaction between melamine and dimethyl sulfoxide is carried out by heating a mixture of melamine with a molar excess of dimethyl sulfoxide based on melamine at a temperature in the range of from about 200° to about 300° F. and preferably in the range of from about 320° to about 350° F. in the presence of an acid catalyst. The above temperature ranges may, of course, be varied at greater than or less than atmospheric pressure as is known to the art. I have found that only a trace of acid catalyst is necessary although greater amounts may be used.

Although only a molar excess of dimethyl sulfoxide is necessary for the reaction, dimethyl sulfoxide is also advantageously used as the solvent for melamine since other solvents may dilute the dimethyl sulfoxide sufficiently to render it relatively inactive in the desired reaction. Therefore, at least twenty moles of dimethyl sulfoxide per mole of melamine may advantageously be used and preferably thirty moles of dimethyl sulfoxide per mole of melamine is used.

The acid catalyst may be any known organic or inorganic acid catalyst such as benzoic acid, acetic acid, sulfuric acid, hydrochloric acid, hydrofluoric acid, nitric acid, etc. The reaction proceeds more quickly when the stronger acids are used and the choice of the acid catalyst will depend upon the desired rate of reaction. For example, I have found that the reaction may proceed within from about 15 to about 30 minutes when sulfuric acid is used as a catalyst while benzoic acid promotes the reaction within from about three to ten hours. It is also intended that the acid catalyst and melamine may be added in the form of the acid salt of melamine, such as melamine acetate for example. Advantageously, the catalyst should be used in amounts of at least 1 weight percent based on melamine and the amount of catalyst will vary with the strength of the catalyst used. For example, when a strong acid such as sulfuric acid is used as the catalyst, 1 weight percent of sulfuric acid may be sufficient; however when a weak acid such as benzoic or acetic acid is used, the acid catalyst should be used in amounts of at least 2 weight percent based on melamine. Of course, much greater amounts of catalyst may be used. In the case where an acid salt of melamine is used as a starting material, no additional acid catalyst need be used.

Melamine and dimethyl sulfoxide and methods for their preparation are well known. However, both of these reactants are available commercially at a low cost which allows preparation of the present thickening agents on a low cost basis without the necessity of additionally manufacturing the starting materials.

After completion of the above reaction, the reaction product precipitates. The product is allowed to stand and cool and may be contacted with an excess of water or an organic non-solvent, such as, for example, acetone, xylene, ethanol, etc. or mixtures thereof to aid in removal of the product from the excess of dimethyl sulfoxide. The organic non-solvents are solvents for dimethyl sulfoxide and any impurities present and are well known for their solvent powers. However, the precipitate product is insoluble in organic solvents and such organic solvents will herein be referred to as non-solvents with regard to the precipitate. The resulting precipitate may contain unreacted occluded materials such as dimethyl sulfoxide in varying amounts. The presence of excessive amounts of dimethyl sulfoxide will render the product excessively oleophobic and unsuitable as a grease thickener. Small amounts of dimethyl sulfoxide may be removed by washing with a non-solvent such as for example, those listed above. If such washing is not sufficient, washing the precipitate with a boiling non-solvent or heating a mixture of the precipitate with a large amount of a non-solvent to boiling for a sufficient period of time will remove enough dimethyl sulfoxide to render the product acceptably oleophilic. It is preferred that following removal of the occluded dimethyl sulfoxide, the product be used as a thickening agent while still wet with non-solvent by incorporating it into an oleaginous lubricant vehicle to form a grease product. The grease product may then be heated to drive off the non-solvent if desired. Alternatively, the thickening agent may be heated to drive off most of the non-solvent before incorporating it into the oleaginous lubricant vehicle. However, in the latter case care should be taken not to completely dry the reaction product while driving off non-solvent since I have found that a completely dry product is not effective as a grease thickening agent.

The reaction product prepared as described herein may be used as a thickener for oleaginous lubricant vehicles, advantageously in amounts of from about 8 to about 20 weight percent and preferably from about 10 to about 16 weight percent, to form grease products. The grease products can contain one or more well known addition agents suitable under the conditions of use to impart desired properties thereto, such as, by way of example, antioxidants, extreme pressure agents, corrosion inhibitors, anti-leak agents, anti-foam agents, graphite, molybdenum sulfide, etc. It is also intended that the reaction products may be incorporated into oleaginous lubricant vehicles with or without such well known addition agents, in amounts such as to form grease thickening agent concentrates containing from about 35 to about 75 weight percent of the reaction product and capable of dilution with an oleaginous lubricant vehicle to form a grease product.

Oleaginous lubricant vehicles which can be thickened with the herein described grease thickener compounds to form grease products can be silicone polymer oils, mineral lubricating oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "Fluorolube" (made by Hooker Chemical Company), the trifluoroethylene polymers, and other lubricant vehicles.

The silicone polymer oils which may be employed in accordance with the present invention are those falling substantially within the lubricating oil viscosity range. In general, such oils have the following unit structure:

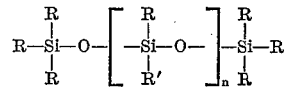

wherein R and R' represent substituted or unsubstituted alkyl, aryl, alkylaryl, arylakyl or cycloalkyl radicals. Such compounds may be produced by well-known methods, e.g., the hydrolysis of dialkyldichlorosilanes or diethoxysilanes with a suitable chain stopper, e.g., a tri-substituted monochlorosilane. For purposes of the present invention, those polymers which are high boiling liquids within the lubricating oil viscosity range are suitable, these generally possessing a viscosity at 100° F. which is within the range of from about 25 to about 3500 S.S.U. It is preferred, for purposes hereof, to employ such oils as have a viscosity at 100° F. of from about 100 S.S.U. to about 1250 S.S.U. Such products are generally colorless and inert, have a very low volatility and undergo relatively slight change in viscosity for a given change in temperature. Relatively common oils of this type are dimethylsilicone polymer, phenylmethylsilicone polymer, chlorophenylmethylsilicone polymer, etc., it being preferred to employ either the phenylmethylsilicone or the chlorophenylmethylsilicone polymer in accordance herewith. Methods of preparing such compounds are taught in numerous patents, e.g., U.S. 2,410,346, U.S. 2,456,496, and in the literature such as "Chemistry of the Silicones," by Rochow, page 61, et seq. A particularly desirable phenylmethylsilicone polymer for use in accordance with the present invention is Dow-Corning 550 Silicone Fluid, a product of Dow-Corning, Inc., which has a Saybolt Universal viscosity at 100° F. of about 300 to about 400 seconds. Another suitable silicone polymer is a chlorophenylmethylsilicone marketed as GE 81406 by General Electric Company.

Other oleaginous vehicles which may be employed herewith are, for example, mineral oils in the lubricating oil viscosity range, i.e. from about 50 S.S.U. at 100° F. to about 300 S.S.U. at 210° F. These mineral oils are preferably solvent extracted, to substantially remove the low V.I. Constituents, e.g., aromatics, with phenol, furfural, B,B'-dichlorodiethylether (Chlorex), liquid $SO_2$, nitrobenzene, etc. Synthetic lubricating oils resulting from polymerization of unsaturated hydrocarbons or other oleaginous materials within the lubricating oil viscosity range such as high molecular weight polyoxyalkylene compounds such as polyalkylene glycols and ethers and esters thereof, aliphatic diesters of dicarboxylic acids such as the butyl, hexyl, 2-ethylhexyl, decyl, lauryl, etc. esters of sebacic acid, adipic acid, azeleic acid, etc., may be thickened by the reaction products of the present invention to produce excellent greases. Polyfluoro derivatives of organic compounds, particularly hydrocarbons, and dibasic acid esters of

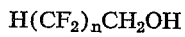

in the lubricating oil viscosity range can be thickened with compounds of the present invention. Other synthetic oils, such as esters of aliphatic carboxylic acids and polyhydric alcohol, e.g., trimethylolpropane pelargonate, pentaerythritol hexanoate, can be used as suitable oil vehicles. Where the grease product is to be employed under high temperature conditions lubricating oils which are stable, i.e., do not decompose, at the temperatures to be encountered should be used as the lubricant vehicle. For such uses, it is preferred to use oils such as silicone polymers, fluorocarbons and the like.

The following examples illustrate the preparation of novel grease thickening agents in accordance with this invention:

EXAMPLE I 20 g. of melamine were mixed with 350 ml. (36 moles per mole of melamine) of dimethyl sulfoxide and 0.5 g. of benzoic acid catalyst. The reaction mixture was heated at about 350° F. for seven hours and 30 minutes, a white spongy melamine-dimethyl sulfoxide reaction product formed in the reaction mixture which mixture was then poured into 1000 ml. of water. The precipitate was separated from the water as the final product and was found to be sufficiently oleophilic for use as a grease thickener. Yield was 22 grams. 12 percent of the product in Dow Corning 550 Silicone Fluid produced a non-thixotropic grease with an unworked penetration of 350.

EXAMPLE II 5 g. of melamine were mixed with 100 ml. (42 moles per mole of melamine) of dimethyl sulfoxide and 0.25 g. of sulfuric acid catalyst. The reaction mixture was heated at about 330° F. for 45 minutes, a white spongy melamine-dimethylsulfoxide reaction product formed in the reaction mixture which mixture was then poured into 500 ml. of water. The precipitate was separated from the water as the final product and was found to be sufficiently oleophilic for use as a grease thickener. Yield was 5.1 g. 15 percent of the product in Dow Corning 550 Silicone Fluid gave an unworked penetration of 295.

EXAMPLE III

A mixture of 10 g. of melamine with 200 ml. (42 moles per mole of melamine) of dimethyl sulfoxide containing 0.2 gram of benzoic acid catalyst was heated at about 340° F. in an oil bath. After 10 hours, a heavy precipitate had formed and the reaction mixture was then cooled. The spongy, white melamine-dimethyl sulfoxide reaction product precipitate was filtered from the reaction mixture and washed with 250 ml. of acetone. Yield was 11 grams. 11 percent of the product in Dow Corning 550 Silicone Fluid produced a non-thixotropic grease with an unworked penetration of 345.

EXAMPLE IV

A mixture of 2 grams of melamine and 50 ml. (53 moles per mole of melamine) of dimethyl sulfoxide containing 0.1 gram of benzoic acid catalyst was heated at a temperature of about 250° F. after 16 hours a precipitate was formed and the reaction mixture was then cooled and filtered to recover the white melamine-dimethyl sulfoxide reaction product precipitate. The precipitate was washed with acetone and was found to be sufficiently oleophilic for use as a grease thickening agent. Yield was 1.8 grams. 10 percent of the product in Dow Corning 550 Silicone Fluid produced a non-thixotropic grease with an unworked penetration of 340.

EXAMPLE V 2 g. of melamine were mixed with 50 ml. (53 moles per mole of melamine) of dimethyl sulfoxide and 1.0 g. of glacial acetic acid catalyst. The reaction mixture was heated to about 320° F. for 1 hour and 30 minutes. The reaction mixture was diluted with 100 ml. methanol; the precipitate was collected and washed with about 200 ml. additional methanol. The precipitate product was found adequately oleophilic for use as a grease thickener. Yield was 1.5 g. 10 percent of the product in Dow Corning 550 Silicone Fuid produced a non-thixotropic grease with an unworked penetration of 329.

EXAMPLE VI

A mixture of 10 g. of melamine, 200 ml. (42 moles per mole of melamine) of dimethyl sulfoxide, and 0.2 gram of benzoic acid catalyst was heated at 340° F. in an oil bath. After 10 hours, a precipitate formed and the mixture was cooled. The precipitate was recovered by filtration and washed with 500 ml. of water and then 200 ml. of acetone. The precipitate was then admixed with 300 ml. of xylene and heated to boiling. In one-half an hour the temperature of the boiling mixture rose from 170° to 270° F. The mixture was then filtered to recover the precipitate which was sucked nearly dry in a Büchner funnel. The resulting product was sufficiently oleophilic for use as a grease thickening agent. Yield was 8.5 g. 12 percent of the product in Dow Corning 550 Silicone Fluid produced a non-thixotropic grease with an unworked penetration of 287.

EXAMPLE VII 15 g. of melamine acetate were heated in 250 ml. dimethyl sulfoxide and 5 ml. water at 320° F. for 3 hours. The mixture was cooled and diluted with 100 ml. acetone, filtered and the precipitate was washed with 200 ml. more acetone and used as a thickener to form grease. Yield was about 10 g. 16 percent of the product as a thickener in Dow corning 550 Silicone Fluid produced a non-thixotropic grease with an unworked penetration of 270.

A portion of the product of Example I was dried completely and heated to a temperature of 500° F. in an attempt to discover the melting point of the product. The product was found not to melt at or below that temperature.

Samples of products indicated below were subjected to elemental analysis by usual quantitative procedures and the results were as listed in the following table:

Table I

| Sample | Elemental Analysis | | | | |
|---|---|---|---|---|---|
| | Percent C | Percent H | Percent O [1] | Percent N | Percent S |
| Example I | 30.27 | 5.31 | 5.40 | 51.90 | 7.12 |
| Example II | 32.43 | 4.92 | 8.22 | 48.28 | 6.15 |
| Example IV | 36.98 | 4.77 | 8.41 | 44.90 | 4.94 |
| Example V | 34.68 | 5.03 | 8.02 | 46.40 | 5.87 |

[1] Oxygen values were not determined but arrived at by difference from 100%.

Although I do not intend to be held to any theories regarding the structural nature of the reaction product herein formed, the slight differences in analyses of the products indicate that the grease thickener of this invention may be a condensation polymer of slightly varying structure depending upon relative concentrations of reactants and other reaction variables. This indication of a polymeric structure is further supported by the high melting point and thermal stability of the thickener and its virtual insolubility in all solvents. Additional support for the polymeric structure is derived from electron micrographs of greases containing the thickener which electron micrographs show the thickener particles to have the same general "popcorn" structure as is noted in other greases thickened with a polymer, e.g., polyacrylonitrile.

The reaction products formed in the above examples were incorporated into oleaginous lubricant bases and tested as greases by penetration test as indicated above and high speed bearing tests. When greases are indicated herein as having been prepared from the reaction products of Examples I, II, III, IV, V, and VII, the grease product was heated after its preparation to drive off non-solvents still present in the reaction product.

In Table II are set forth tabulated bearing test data on grease compositions formulated with Dow Corning 550 Silicone Fluid containing products of the above examples. The bearing test is one tentatively adopted by the Coordinating Research Council, designated Test Method L-35, referred to as the "ABEC-NLGI Test," and described in ABEC-NLGI Technical Bulletin No. 5, November 1944. The test is carried out as follows: 3.2 grams of the grease sample are placed in each of two bearings disposed on a test spindle. One bearing, a special heat treated precision 204 Normal-Hoffman bearing is subjected to a temperature of 450° F. in an oven, while the second bearing, a standard New Departure 204 bearing is at room temperature. The bearings are rotated on the spindle at 10,000 r.p.m. Temperatures are determined by a thermocouple inserted in the grease between the recess of the bearing in the oven. Failure is adjudged to occur when (1) the temperature of the test bearing reaches 470° F. or higher, (2) wattage in excess of 300% of normal wattage is required, or (3) the bearing does not turn over at the beginning of a test cycle (the test is conducted in cycles of 20 hours operating and 4 hours at rest). The results were as follows:

Table II

| Thickener | Percent Thickener | Temperature, °F. | Hours to failure |
|---|---|---|---|
| Example I | 12 | 450 | 250 |
| Example III | 11 | 450 | 344 |
| Example VI | 12 | 450 | 253 |
| Copper Phthalocyanine [1] | 25 | 450 | 214 |

[1] For purposes of comparison. Copper phthalocyanine is a high temperature grease thickener developed by the U.S. Navy and used under RLG designation. Greases thickened with copper phthalocyanine were also used by CRC in testing out the L-35 designation method.

Percentages given herein and in the appended claims are weight percentages unless otherwise stated.

It is evident from the foregoing that I have provided novel and inexpensive addition agents which may be used in less than normal thickening amounts in high temperature lubricants to form high temperature greases. The addition agents are the melamine-dimethyl sulfoxide reaction products in accordance with this invention.

I claim:
1. A lubricant grease comprising normally liquid oleaginous vehicle thickened with the product obtained by reacting melamine with a molar excess of dimethyl sulfoxide in the presence of at least about one weight percent of an acid catalyst based on weight of melamine at a temperature in the range of from about 200° to 370° F.
2. The lubricant grease of claim 1 wherein the normally liquid oleaginous lubricant vehicle is a mineral lubricating oil.
3. The lubricant grease of claim 1 wherein the normal liquid oleaginous lubricant vehicle is a synthetic lubricating oil.
4. The lubricant grease of claim 3 wherein the synthetic lubricant oil is silicone polymer fluid.
5. The lubricant grease of claim 4 wherein the silicone polymer fluid is a phenyl methyl silicone polymer.
6. A lubricant grease comprising a major amount of a normally liquid lubricant vehicle thickened with from about 5 to about 30 weight percent of the product obtained by reacting melamine with a molar excess of dimethyl sulfoxide in the presence of at least about one weight percent of an acid catalyst based on weight of melamine at a temperature in the range of from about 200° to 370° F.
7. A lubricant grease concentrate comprising a normally liquid lubricant vehicle thickened with from about 35 to about 75 weight percent of the product obtained by reacting melamine with a molar excess of dimethyl sulfoxide in the presence of at least about one weight percent of an acid catalyst based on weight of melamine at a temperature in the range of from about 200° to 370° F.

References Cited by the Examiner
UNITED STATES PATENTS 2,653,935  9/53  Kaiser _____ 260—249.6
2,654,726  10/53  Fisher _____ 260—79.3

DANIEL E. WYMAN, *Primary Examiner.*

UNITED STATES PATENT OFFICE
CERTIFICATE OF CORRECTION

Patent No. 3,205,171 September 7, 1965

John C. Goossens

It is hereby certified that error appears in the above numbered patent requiring correction and that the said Letters Patent should read as corrected below.

Column 1, line 33, for "usch" read -- such --; column 2, line 3, for "300° F." read -- 370° F. --; column 3, line 58, for "arylakyl" read -- arylalkyl --; column 5, line 33, for "to" read -- at --; line 39, for "Fuid" read -- Fluid --; line 68, for "corning" read -- Corning --.

Signed and sealed this 5th day of July 1966.

(SEAL)
Attest:

ERNEST W. SWIDER
Attesting Officer

EDWARD J. BRENNER
Commissioner of Patents